US006866180B2

United States Patent
Mahoney et al.

(10) Patent No.: US 6,866,180 B2
(45) Date of Patent: Mar. 15, 2005

(54) THICK-SECTION METAL FORMING VIA FRICTION STIR PROCESSING

(75) Inventors: Murray W. Mahoney, Camarillo, CA (US); William H. Bingel, Simi Valley, CA (US)

(73) Assignee: Rockwell Scientific Licensing, LLC, Thousand Oaks, CA (US)

(*) Notice: Subject to any disclaimer, the term of this patent is extended or adjusted under 35 U.S.C. 154(b) by 0 days.

(21) Appl. No.: 10/368,674

(22) Filed: Feb. 18, 2003

(65) Prior Publication Data

US 2004/0159696 A1 Aug. 19, 2004

(51) Int. Cl.[7] ........................ B23K 20/12; B21B 15/00; C22F 1/00
(52) U.S. Cl. ........................ 228/112.1; 72/68; 148/564
(58) Field of Search ............................... 228/2.1, 112.1; 428/615; 148/564, 516, 527, 902, 907; 72/57, 68, 709

(56) References Cited

U.S. PATENT DOCUMENTS

| | | | |
|---|---|---|---|
| 5,971,252 A | | 10/1999 | Rosen |
| 6,230,957 B1 | | 5/2001 | Arbegast |
| 6,638,381 B2 | * | 10/2003 | Keener et al. .............. 148/669 |
| 6,660,106 B1 | * | 12/2003 | Babel et al. ................ 148/527 |
| 6,712,916 B2 | * | 3/2004 | Mishra et al. .............. 148/564 |
| 6,726,085 B2 | * | 4/2004 | Litwinski et al. ......... 228/112.1 |
| 2002/0079351 A1 | * | 6/2002 | Mishra et al. ............ 228/112.1 |
| 2003/0111147 A1 | * | 6/2003 | Keener et al. .............. 148/671 |
| 2003/0218052 A2 | * | 11/2003 | Litwinski ................. 228/112.1 |
| 2004/0000576 A1 | * | 1/2004 | Litwinski ................. 228/112.1 |
| 2004/0004107 A1 | * | 1/2004 | Litwinski .................. 228/56.3 |
| 2004/0045335 A1 | * | 3/2004 | Lindner et al. ............... 72/254 |

OTHER PUBLICATIONS

Nicholas, Friction Processing Technologies, Advanced Materials & Processes, Jun. 1, 1999, pp. 69–71, Issue 155 (6), Publisher: ASM International, Materials Park, OH 44073.

* cited by examiner

Primary Examiner—Kiley S. Stoner

(57) ABSTRACT

Friction stir processing (FSP) modifies the surface microstructure of metals so that thick-section metal workpieces can be bent over large angles without formation of surface cracks. A thick 2519-T8 aluminum plate (25.4 mm thick and 50.8 mm wide) was friction stir processed across the pretensile surface to a depth of 6.3 mm, and was then bent at room temperature over a punch with radius 38.1 mm into a v-shaped die to an 80° bend angle. Whereas unprocessed workpieces of this type exhibited surface cracking at 31° bend angle and failed at 40° bend angle, no cracking was evident for the friction stir processed workpiece up to 80° bend angle.

14 Claims, 2 Drawing Sheets

THICK-SECTION METAL FORMING VIA FRICTION STIR PROCESSING

BACKGROUND OF THE INVENTION

1. Field of the Invention

This invention is concerned with forming of metals, by bending, for example, which induces tensile strain in some areas of the surface of the metal.

2. Description of the Related Art

Numerous useful parts and structures are fabricated from aluminum and aluminum alloys, which are malleable and exhibit good oxidation resistance and high strength-to-weight ratios. Thin-section aluminum materials are typically bent or formed to produce desired structures. For thick-section materials, however, cracks tend to form in surfaces undergoing tensile strain during bending or forming operations. Such cracks tend to propagate through the bulk material, resulting in premature failure. Bending and forming of thick aluminum materials is restricted to low bend angles and often requires use of elevated temperatures. Consequently, thick-section aluminum structures are typically fabricated by fusion welding together aluminum parts, usually in the form of plates. Other metals, titanium and ferrous materials, for example, also tend to develop surface cracks during thick-section bending or forming so that fusion welding is generally used to fabricate thick metal structures.

Build up of metal structures by fusion welding is inefficient and expensive compared to fabrication by bending or forming. In addition, fusion welds are prone to defects and tend to be relatively weak and have low ductility because of high residual stress, a coarse microstructure (similar to that of cast parts), weld defects, and extensive precipitate over-aging in the heat affected zone. An effective method for bending and forming thick metals would reduce costs, enhance design flexibility, and improve the mechanical properties of thick metallic structures.

Friction stir processing (FSP) involves passing a rotating FSP tool through a metallic material to locally create a fine-grain microstructure providing improved mechanical properties [F. D. Nicholas, Advanced Materials Processes 6/99, 69 (1999)]. The FSP operation is typically performed at room temperature but the friction and metal deformation involved raises the local temperature to just below the solidus temperature so that the friction stir processed material is annealed and fully recrystallized. Since the material does not undergo melting during FSP, such as occurs during fusion welding, overaging in the heat affected zone is significantly less. Friction stir processing has been demonstrated for a variety of metals and alloys, including aluminum, titanium, bronze, and steel materials. The FSP approach has been used to locally improve the mechanical properties in high-stress areas of cast metal parts but has not previously been applied to enable bending of thick-section parts.

SUMMARY OF THE INVENTION

This invention provides a method for bending and forming thick-section metals while minimizing crack formation on the tensile surface of the workpiece. The projected bend area on the pre-tensile surface of the workpiece is friction stir processed to produce an annealed, fine-grained surface layer exhibiting low flow stress and enhanced formability. Surface cracks are inhibited by friction stir processing to a depth that is a relatively small fraction of the thickness of the workpiece. For example, a one-inch thick plate of 2519-T87 aluminum (2.0 inches wide) was bent via a punch and die to an 80° bend angle (without surface cracking) after the bend area on the pre-tensile surface had been friction stir processed to a depth of only one-quarter inch (6 mm). Friction stir processing is preferably performed by moving the rotating FSP tool substantially parallel with the bend line (perpendicular to the bend radius). Wide areas may be processed by rastering. The invention may be applied to bending and forming workpieces comprised of a variety of metals, including aluminum, titanium, nickel, copper, iron, and alloys thereof.

Further features and advantages of the invention will be apparent to those skilled in the art from the following detailed description, taken together with the accompanying drawings.

DETAILED DESCRIPTION OF THE INVENTION

Figure 1:
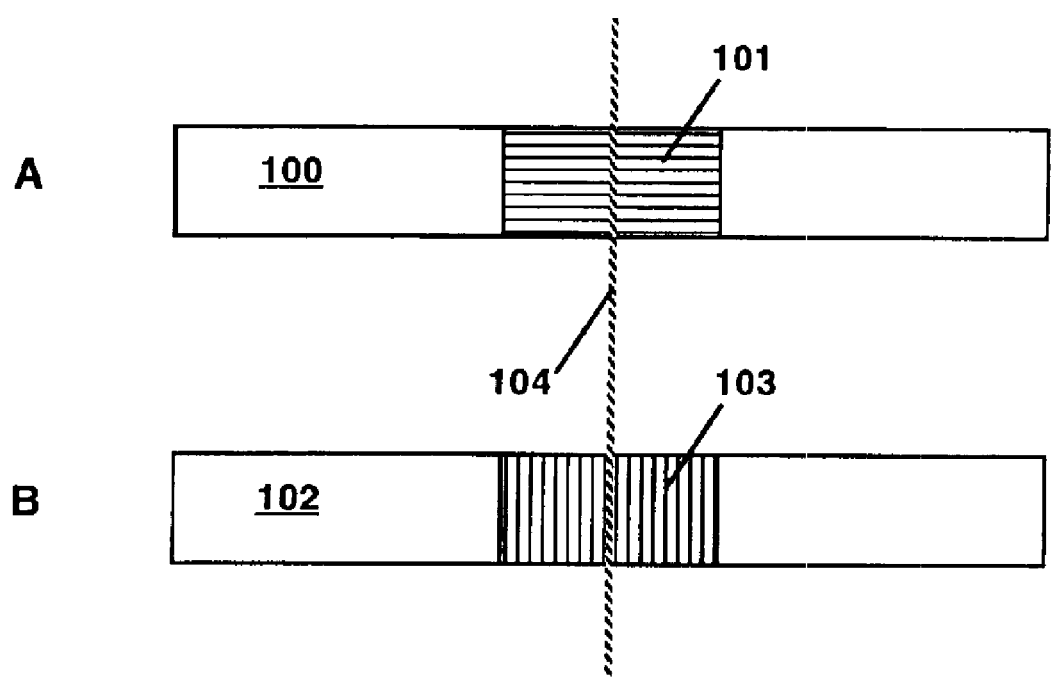
FIG. 1 schematically depicts top views of thick-section workpieces with (A) longitudinal and (B) transverse friction stir processing raster lines.

Technical terms used in this document are generally known to those skilled in the art. Forming involves deforming a metal workpiece into a desired shape, usually by applying force or pressure to cause the workpiece to substantially conform to a mandrel (punch, die or stamp). The term "forming" includes "bending" as a subset. A formed part may have a plurality of bends, and the bend lines may be at various angles and may be linear or curved. The "bend area" is the area of the surface of the workpiece that is deformed during bending or forming. As used in this document, the term "surface" denotes the surface region of a material. Thus, surface cracks extend below the actual geometric surface, and friction stir processing of a surface involves processing material to a predetermined distance below the actual surface. The pre-tensile surface of a workpiece undergoes tensile strain during deformation (becomes convex), and is the tensile surface on the bent or formed workpiece. A bend line consists of points of maximum curvature on the tensile surface within a bend area. The FSP tool is the rotating bit that moves through the workpiece material during friction stir processing.

The invention provides a method for bending and forming thick-section metal workpieces while minimizing formation of cracks that would weaken the material and could lead to premature failure. In this method, the bend area on the pre-tensile surface of the workpiece is friction stir processed to produce an annealed fine-grained microstructure, which tends to locally increase the ductility and reduce the stress required for material flow. Crack formation and propagation are inhibited since the friction stir processed surface has increased ductility and plastically deforms to accommodate the tensile stress produced during bending or forming. In addition, friction stir processing tends to remove surface cracks originally present in the workpiece. Typically, the method of the present invention substantially prevents cracking during thick-section bending and forming.

The depth of friction stir processing needed to inhibit surface cracking is typically a relatively small percentage of the thickness of the workpiece. For example, a one-inch thick plate of 2519-T87 aluminum may be bent to a bend angle of 80° (without formation of surface cracks) after friction stir processing of the pre-tensile surface to a depth of only one-quarter inch (6 mm), corresponding to 25% of the plate thickness. The required friction stir processing depth needed to inhibit surface cracking depends on the type and thickness of material to be bent or formed, and on the bending and forming conditions. Those skilled in the art will appreciate that the process parameters which may be required in a particular application may vary considerably, depending upon such factors as the particular material involved, its thickness and its processing history. It is likely, however, that the required friction stir processing depth will generally be less than 50% of the maximum thickness of the material to be bent or formed. Within the scope of the present invention, an effective friction stir processing depth may be selected intuitively, be determined empirically, or be selected based on materials calculations (finite element analysis, for example). The friction stir processing depth is typically constant but could also be varied.

To ensure that cracking is effectively inhibited during bending or forming, the friction stir processed zone preferably extends along substantially the entire length of the bend line, and substantially throughout the bend area to either side of the bend line. However, smaller friction stir processed areas may also produce acceptable results.

Larger areas are typically friction stir processed by rastering, which involves multiple parallel passes of the FSP tool along the workpiece surface. Raster passes are typically overlapped but this may not be necessary. As those skilled in the art will appreciate, the tool could be moved in various other patterns, circular spirals, for example, to friction stir process larger areas.

FIG. 1 schematically depicts top views of thick-section workpieces prepared for bending by raster friction stir processing, with the raster direction indicated by parallel lines and the bend line indicated by broken line 104. FIG. 1A shows a friction stir processed zone 101 produced by longitudinal rastering (raster lines perpendicular to the bend line) of work piece 100. FIG. 1B shows a friction stir processed zone 103 produced by transverse rastering (raster lines parallel to the bend line) of work piece 102. Longitudinal rastering is preferred since it gave better results than traverse rastering in 80° bend tests of one-inch thick 2519-T87 aluminum plates (2 inches wide). However, transverse, oblique, or circular spiral rastering may give acceptable results in some cases, depending on the shape to be formed.

Figure 2:
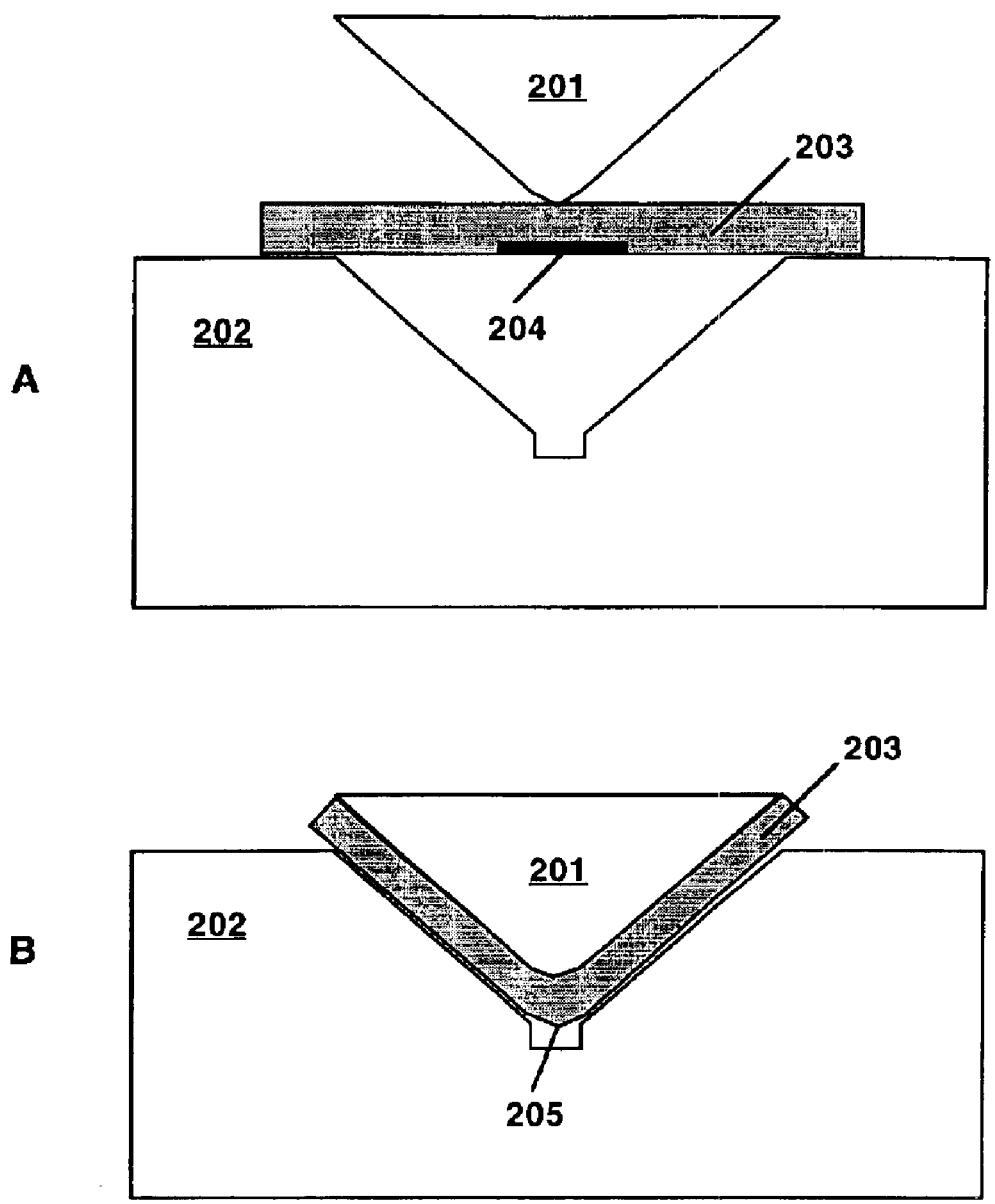
FIG. 2 schematically depicts side views of a punch and die assembly with (A) an unbent workpiece and (B) a bent workpiece.

FIG. 2 schematically depicts side views of a typical punch and die assembly used to bend thick-section workpieces. As shown in FIG. 2A, punch 201 is initially pressed against unbent workpiece 203, which is positioned above die 202. According to the present invention, a region 204 on the pre-tensile surface of workpiece 203 is friction stir processed to inhibit formation of surface cracks during the bending operation. As shown in FIG. 2B, pressure applied via punch 201 and die 202 causes workpiece 203 to bend to a predetermined shape. Crack formation in tensile surface 205 is inhibited by friction stir processing according to the present invention.

Any friction stir processing equipment and conditions providing an acceptable fine-grained microstructure may be used to practice the invention. A variety of FSP tool shapes and sizes are available commercially. A typical FSP tool has a spiral-shaped pin and cylindrical shoulder. Features on the pin tend to cause workpiece material to flow toward the surface during friction stir processing, and have a diameter in the 2 mm to 15 mm range. The shoulder is designed to contain and reforge the processed material and has a diameter in the 6 mm to 50 mm range. Typical FSP tool materials are tool steels, cubic boron nitride, nickel-based super alloys, tungsten carbide, and other tungsten-based alloys. FSP tools typically rotate at 150 to 2000 rpm and move along the surface of the workpiece at 50 to 7000 mm/minute. Friction stir processing equipment is available commercially from MTS, General Tool, and ESAB.

The present invention enables bending and forming of thick-section workpieces comprised of a variety of metals, including aluminum, titanium, nickel, copper, iron, and alloys thereof. The invention is useful for reducing costs, enhancing design flexibility, and improving the mechanical properties of thick metallic structures (turrets and other components of armored vehicles, for example).

Description of a Preferred Embodiment

The efficacy of the invention was demonstrated via bend tests of thick-section plates of 2519-T87 aluminum having a thickness of 1.0 inch (2.54 cm), a width of 2.0 inches (5.08 cm), and a length of about 10 inches (25 cm). Plates were bent using a heavy-duty punch and die assembly in a 400 ton press. The punch had a radius of 1.5 inches (38.1 mm) and was driven at 15 mm/minute. Friction stir processing was performed using a threaded cylindrical FSP tool (9 mm diameter pin and 25 mm diameter shoulder) rotated at 600 rpm and moved along the workpiece surface at 100 mm/minute. FSP rastering was performed with 50% overlap of the pin diameter between adjacent passes.

EXAMPLE 1

An unprocessed aluminum plate bend tested at 200° C. to a bend angle of 75° exhibited several cracks in the tensile surface. The cracks were parallel to the bend line and the longest (near the bend line) was about one inch in length. Microscopic examination of cross-sections indicated that the cracks were several millimeters deep.

EXAMPLE 2

An unprocessed aluminum plate was bend tested at ambient temperature. At less than 40° bend angle, the plate fractured with a loud noise (significant energy release).

EXAMPLE 3

An unprocessed aluminum plate bend tested to an angle of 31° exhibited a small surface crack (parallel with the bend line), which was about 2 mm long and 0.5 mm wide (at the widest point near the midpoint of the crack). When removed from the punch and die assembly, this plate sprung back by more than 6° to a bend angle of less than 25 degrees.

EXAMPLE 4

Friction stir processing was performed over a pre-tensile surface area (2 inches wide×5 inches long) of an aluminum plate to a depth of ⅜ inch by rastering back and forth perpendicular to the bend line. Only a few small surface cracks were observed on the tensile surface after the plate was bent to a bend angle of 85° at 200° C.

EXAMPLE 5

Friction stir processing was performed over a pre-tensile area (2 inches wide×5 inches long) of an aluminum plate to a depth of ¼ inch by rastering back and forth parallel to the bend line. No surface cracks were observed on the tensile surface after the plate was bent to a bend angle of 80° at room temperature.

What is claimed is:

1. A method for forming a metallic workpiece, comprising the steps of:

friction stir processing a predetermined area of a pre-tensile surface of the workpiece to a depth of up to 50% of the maximum thickness of the workpiece; and forming the workpiece such that at least a portion of the predetermined area undergoes tensile strain in a bend area.

2. The method of claim 1, wherein the metallic workpiece comprises a metal selected from the group consisting of aluminum, titanium, nickel, copper, iron, and alloys thereof.

3. The method of claim 1, wherein the metallic workpiece is a metal plate.

4. The method of claim 1, wherein said step of friction stir processing is performed using a FSP tool rotating at a rate between 150 and 2000 rotations per minute.

5. The method of claim 1, wherein said step of friction stir processing is performed using a FSP tool moved along the workpiece surface at a rate of 50 to 7000 mm/minute.

6. The method of claim 1, wherein the predetermined area of the pre-tensile surface of the workpiece substantially coincides with the bend area.

7. A method for bending a metal workpiece, comprising the steps of:

friction stir processing a predetermined area of a pre-tensile surface of the workpiece to a depth of up to 50% of the maximum thickness of the workpiece; and bending the workpiece such that at least a portion of the predetermined area undergoes tensile strain in a bend area.

8. The method of claim 7, wherein the metallic workpiece comprises a metal selected from the group consisting of aluminum, titanium, nickel, copper, iron, and alloys thereof.

9. The method of claim 7, wherein the metallic workpiece is a metal plate.

10. The method of claim 7, wherein said step of friction stir processing is performed using a FSP tool rotating at a rate between 150 and 2000 rotations per minute.

11. The method of claim 7, wherein said step of friction stir processing is performed using a FSP tool moved along the workpiece surface at a rate of 50 to 7000 mm/minute.

12. The method of claim 7, wherein the predetermined area of the pre-tensile surface of the workpiece substantially coincides with the bend area.

13. A method for forming an aluminum workpiece, comprising the steps of:

friction stir processing a predetermined area of a pre-tensile surface of the aluminum workpiece to a depth of up to 50% of the maximum thickness of the workpiece; and forming the aluminum workpiece such that at least a portion of the predetermined area undergoes tensile strain in a bend area.

14. A method for bending an aluminum workpiece, comprising the steps of:

friction stir processing a predetermined area of a pre-tensile surface of the aluminum workpiece to a depth of up to 50% of the maximum thickness of the workpiece; and bending the aluminum workpiece such that at least a portion of the predetermined area undergoes tensile strain in a bend area.

* * * * *

UNITED STATES PATENT AND TRADEMARK OFFICE
CERTIFICATE OF CORRECTION

| | | |
|---|---|---|
| PATENT NO. | : 6,866,180 B2 | |
| APPLICATION NO. | : 10/699216 | |
| DATED | : March 15, 2005 | |
| INVENTOR(S) | : Murray W. Mahoney and William H. Bingel | |

It is certified that error appears in the above-identified patent and that said Letters Patent is hereby corrected as shown below:

Please insert the following at Column 1, Line 4 (after the title and before the first "BACKGROUND OF THE INVENTION HEADING):

STATEMENT REGARDING FEDERALLY SPONSORED RESEARCH OR DEVELOPMENT

This invention was made with Government support under Contract Number N00014-00-C-0520 awarded by the Department of Navy. The Government has certain rights in the invention.

Signed and Sealed this

Twenty-first Day of November, 2006

JON W. DUDAS
*Director of the United States Patent and Trademark Office*